US010703255B2

(12) United States Patent
Yoshioka et al.

(10) Patent No.: US 10,703,255 B2
(45) Date of Patent: Jul. 7, 2020

(54) INDUSTRIAL VEHICLE AND HEADLIGHT

(71) Applicant: Mitsubishi Logisnext Co., Ltd., Kyoto (JP)

(72) Inventors: Masahiro Yoshioka, Kyoto (JP); Seiya Ito, Kyoto (JP)

(73) Assignee: MITSUBISHI LOGISNEXT CO., LTD., Kyoto (JP)

( * ) Notice: Subject to any disclaimer, the term of this patent is extended or adjusted under 35 U.S.C. 154(b) by 0 days.

(21) Appl. No.: 16/275,397

(22) Filed: Feb. 14, 2019

(65) Prior Publication Data
US 2019/0299844 A1 Oct. 3, 2019

(30) Foreign Application Priority Data
Mar. 30, 2018 (JP) .................... 2018-066700

(51) Int. Cl.
| *B60Q 1/04* | (2006.01) |
| *B60R 1/06* | (2006.01) |
| *B66F 9/075* | (2006.01) |
| *B60Q 1/06* | (2006.01) |

(52) U.S. Cl.
CPC .............. *B60Q 1/0483* (2013.01); *B60Q 1/06* (2013.01); *B60R 1/06* (2013.01); *B66F 9/07504* (2013.01); *B60Y 2200/15* (2013.01)

(58) Field of Classification Search
CPC ............... B60Q 1/0483; B60Y 2200/15; B66F 9/07504; B60R 1/06
See application file for complete search history.

(56) References Cited

U.S. PATENT DOCUMENTS

| 2015/0142278 | A1* | 5/2015 | Mehaffey | ................ | B66F 9/07 701/50 |
| 2017/0015368 | A1* | 1/2017 | Miyazaki | ............. | B62D 21/186 |
| 2019/0300347 | A1* | 10/2019 | Yoshioka | ............ | B66F 9/07504 |

FOREIGN PATENT DOCUMENTS

| JP | S49-127188 | 10/1974 |
| JP | H03-42438 | 4/1991 |
| JP | H05-58487 | 8/1993 |
| JP | 2003-112894 | 4/2003 |
| JP | 2008-061595 | 3/2008 |
| JP | 2015159746 A | * 9/2015 |

OTHER PUBLICATIONS

Machine Translation of JP 2015-159746.*
Machine Translation of JP 2003-112894.*
Machine Translation of JPH 05-58487.*
Machine translation of JPH 05-58487U.*

* cited by examiner

*Primary Examiner* — Diem M Tran
(74) *Attorney, Agent, or Firm* — Kirschstein, Israel, Schiffmiller & Pieroni

(57) ABSTRACT

An industrial vehicle includes a vehicle body, a pair of right and left front pillars provided in the front portion of the vehicle body, and a headlight provided on the front pillar. The headlight is provided with a light and a bracket to which the light is attached. The bracket has an attachment plate and a protective frame formed in the front portion of the attachment plate. The protective frame has a vertical frame and a first horizontal frame and a second horizontal frame shorter than the vertical frame.

3 Claims, 7 Drawing Sheets

INDUSTRIAL VEHICLE AND HEADLIGHT

BACKGROUND OF THE INVENTION

1. Field of the Invention

The present invention relates to an industrial vehicle and a headlight.

2. Description of the Related Art

In general, an industrial vehicle such as a forklift is equipped with a headlight that illuminates a space in front of the vehicle (see, for example, JP 2003-112894 A and JP 3-42438 Y).

The headlight that is described in JP 2003412894 A includes a light, a box-shaped outer frame, a base on which the light is placed, and a pair of guard bars provided on the right and left of the light, and thus has a problem in that the number of parts is large. In addition, the headlight described in JP 2003/112,894 A protrudes to a large extent in a right-left direction from a front pillar as an attachment place. Accordingly, the headlight described in JP 2003412894 A causes problems by narrowing a driver's field of view and impairing the appearance of the forklift.

The headlight that is described in JP 3-42438 Y includes a light, a box-shaped outer frame, a light attachment plate, a rotating bracket, a bolt, and a nut, and thus has a problem in that the number of parts is large.

In addition, the headlight described in JP 3-42438 Y causes problems by impairing the appearance of the forklift with the box-shaped outer frame placed in the upper portion of the forklift.

SUMMARY OF THE INVENTION

The invention has been made in view of the above circumstances, and an object of the invention is to provide an industrial vehicle and a headlight constituted by a relatively small number of parts and hardly impaired in terms of appearance.

In order to solve the above problem, an industrial vehicle according to the invention includes a vehicle body, a pair of right and left front pillars provided in a front portion of the vehicle body, and a headlight provided on the front pillar. The headlight includes a light illuminating a space in front of the vehicle body and a bracket to which the light is attached. The bracket has an attachment plate having a front portion to which the light is attached and a rear portion attached to the front pillar and a protective frame formed in the front portion of the attachment plate so as to cover at least a part of the light. The protective frame has a vertical frame extending in an upward-downward direction of the vehicle body and a first horizontal frame and a second horizontal frame extending in a right-left direction of the vehicle body and shorter than the vertical frame.

In the industrial vehicle described above, the light may have a front portion and a rear portion, the front portion of the light may be accommodated in the protective frame, and the rear portion of the light may be removably attached to the attachment plate in a state of leaving the protective frame rearwards.

In the industrial vehicle described above, the light may have a width within a width of the front pillar.

The industrial vehicle described above may include a side mirror provided on the front pillar. The front pillar may have a front surface, a rear surface, an inner surface, and an outer surface. The side mirror may be provided with a mirror main body, a mirror attachment portion to which the mirror main body is attached, and fixing means for fixing the mirror attachment portion to the inner surface of the front pillar. The attachment plate of the bracket may be fixed to the outer surface of the front pillar by the fixing means.

In the industrial vehicle described above, the front surface and the rear surface of the front pillar may differ in width from each other. The attachment plate may have a bent portion between the front portion and the rear portion. The rear portion of the attachment plate may extend along the outer surface of the front pillar. The front portion of the attachment plate may extend perpendicularly to the front surface of the front pillar.

In order to solve the above problem, a headlight according to the invention, which is removably attached to an industrial vehicle, includes a light and a bracket to which the light is attached. The bracket includes an attachment plate having a front portion to which the light is attached and a protective frame formed in the front portion of the attachment plate so as to cover at least a part of the light. The protective frame has a vertical frame, a first horizontal frame shorter than the vertical frame, and a second horizontal frame shorter than the vertical frame.

In the headlight described above, the light may include a front portion and a rear portion, the front portion of the light may be accommodated in the protective frame, and the rear portion of the light may be removably attached to the attachment plate in a state of leaving the protective frame rearwards.

In the headlight described above, the light may be attached to the attachment plate such that an attachment angle is adjustable.

According to the invention, it is possible to provide an industrial vehicle and a headlight constituted by a relatively small number of parts and hardly impaired in terms of appearance.

DETAILED DESCRIPTION OF THE PREFERRED EMBODIMENTS

Hereinafter, embodiments of an industrial vehicle and a headlight according to the invention will be described with reference to accompanying drawings. Regarding the embodiments of the industrial vehicle, a forklift will be described as an example. The following upward-downward, right-left, and forward-rearward directions are based on the vehicle body of the forklift.

First Embodiment

Figure 1:
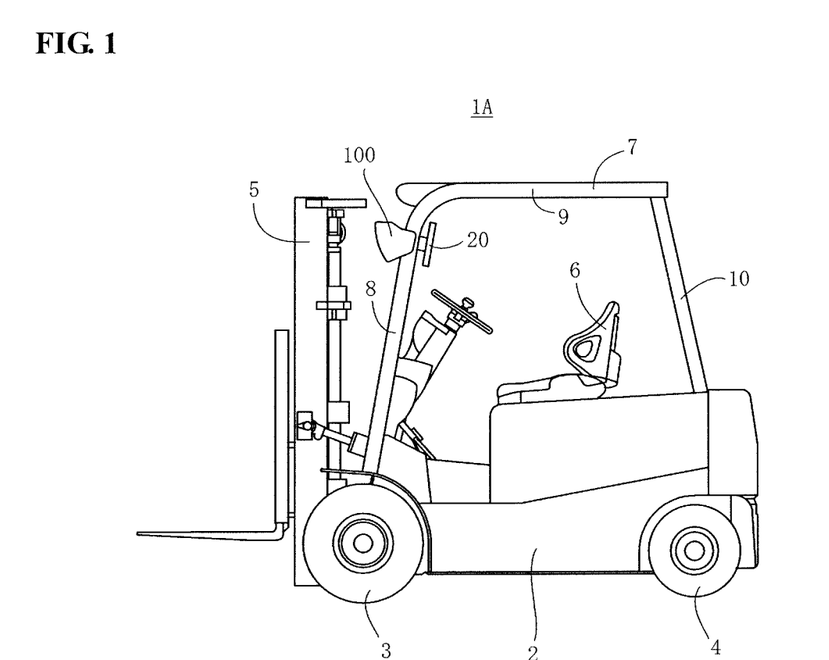
FIG. 1 is a side view of a forklift according to a first embodiment.

FIG. 1 is a side view illustrating a forklift 1A according to a first embodiment of the invention. The forklift 1A is provided with a vehicle body 2, a front wheel 3 provided on the lower front side of the vehicle body 2, a rear wheel 4 provided on the lower rear side of the vehicle body 2, a cargo handling apparatus 5 provided in the front portion of the vehicle body 2, a driver's seat 6 and a head guard 7 provided in the upper portion of the vehicle body 2, a headlight 100 according to the first embodiment of the invention, and a side mirror 20.

The cargo handling apparatus 5 includes each cylinder (a lift cylinder, a tilt cylinder, and a reach cylinder), a carriage, a pair of right and left masts erected on the carriage, and a pair of right and left forks attached to the masts so as to be movable up and down. For example, the lift cylinder raises and lowers the forks, the tilt cylinder tilts the forks, and the reach cylinder moves the carriage back and forth.

A steering wheel, an accelerator lever, cargo handling levers (a lift lever, a tilt lever, and a reach lever), and the like are provided in front of the driver's seat 6.

The head guard 7 includes a pair of right and left front pillars 8, a pair of right and left side beams 9, a pair of right and left rear pillars 10, and a roof.

Figure 4A:
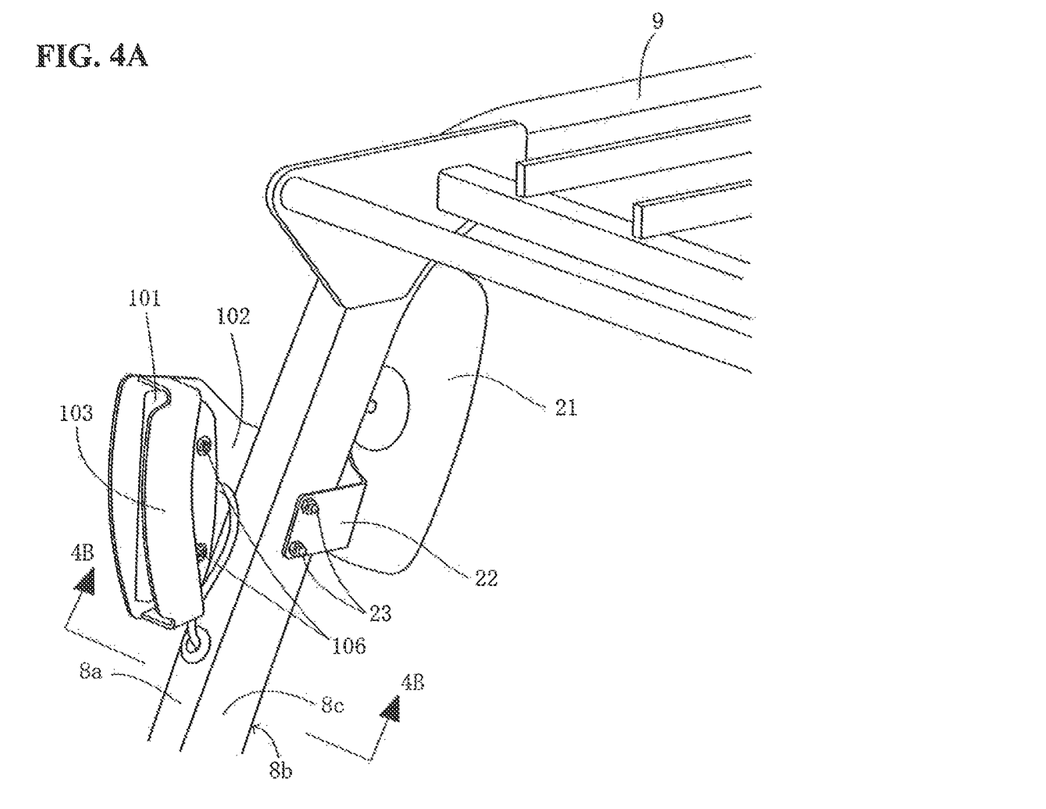
FIG. 4A is a diagram illustrating a state where a side mirror according to the first embodiment is attached.
Figure 4B:
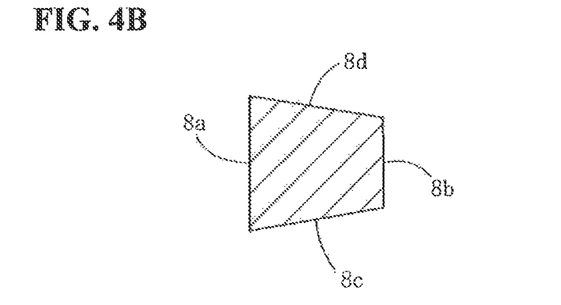
FIG. 4B is a sectional view taken on line 4B—4B of FIG. 4A.

A rectangular pipe member extending inn the upward-downward direction constitutes the front pillar 8. The outer peripheral surface of the front pillar 8 is formed by a front surface 8a, a rear surface 8b facing the front surface 8a, an inner surface 8c, and an outer surface 8d facing the inner surface 8c (see FIGS. 4 and 5). The lower end of the front pillar 8 is provided in the front portion of the vehicle body 2. The upper end of the front pillar 8 is positioned slightly behind the lower end of the front pillar 8.

A rectangular pipe member extending in the forward-rearward direction constitutes the side beam 9. The front end of the side beam 9 is continuous with the upper end of the front pillar 8. In other words, a series of pipe members constitutes the front pillar 8 and the side beam 9. Incidentally, a series of pipe members may form the side beam 9 and the rear pillar 10.

A rectangular pipe member extending in the upward-downward direction constitutes the rear pillar 10. The lower end of the rear pillar 10 is provided in the rear portion of the vehicle body 2, and the upper end of the rear pillar 10 is in contact with the lower side of the rear end portion of the side beam 9. The upper end of the rear pillar 10 is positioned slightly ahead of the lower end of the rear pillar 10.

The roof is provided with a plurality of first pipes extending in a right-left direction between the front pillars 8 and a plurality of second pipes extending in the forward-rearward direction in parallel with the side beams 9. The roof is formed in a lattice shape by the first pipes and the second pipes.

Figure 2:
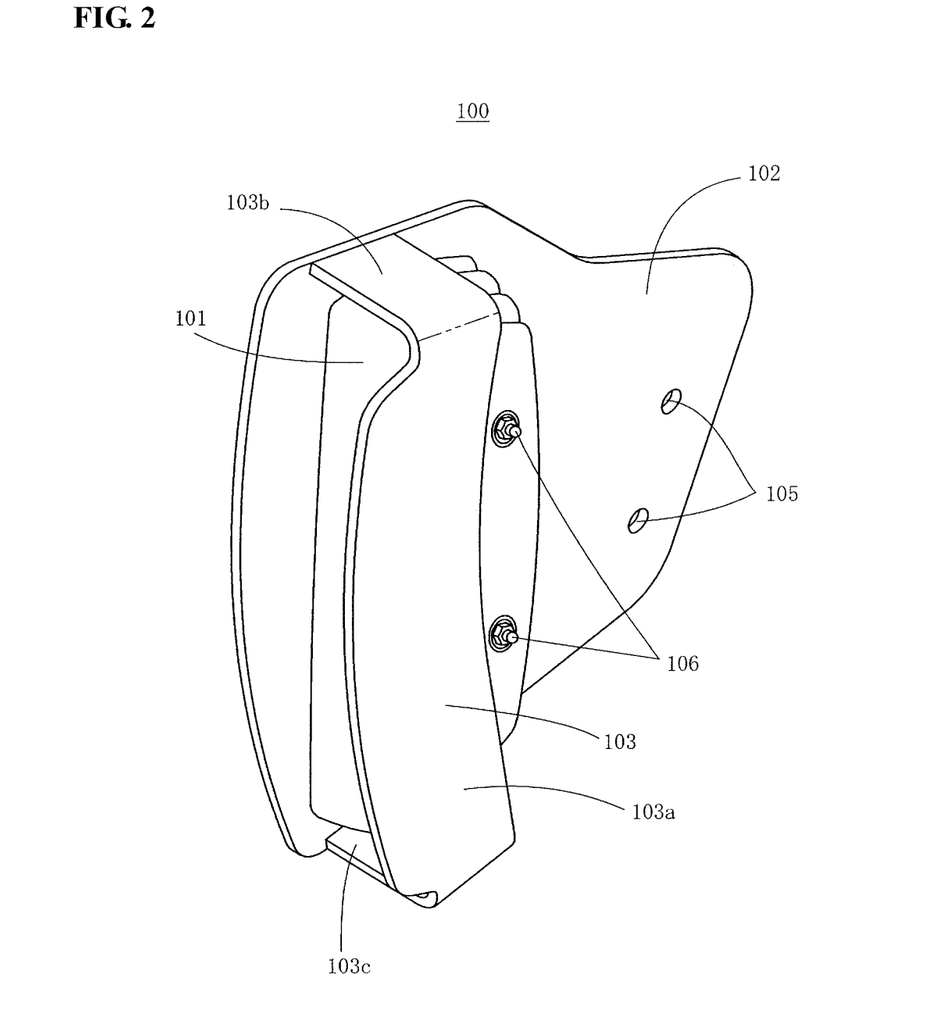
FIG. 2 is a perspective view of a headlight according to the first embodiment.

The headlight 100 is provided for each front pillar 8. As illustrated in FIG. 2, the headlight 100 is provided with a light 101 and a metallic bracket (such as a bracket made of iron) including an attachment plate 102 and a protective frame 103.

The light 101 emits white light that illuminates the space in front of the vehicle body 2. The light 101 includes, for example, a light source including at least one white light emitting diode. The length (width) of the light 101 in the right-left direction is shorter than the length of the light 101 in the upward-downward direction. In the present embodiment, the light 101 has a width within the width of the front surface 8a of the front pillar 8.

The light 101 is attached to the front portion of the attachment plate 102 by fixing means 106 such that the attachment angle of the light 101 can be adjusted. The fixing means 106 includes, for example, a shaft portion such as a bolt and a fixing portion such as a nut. In the present embodiment, two sets of bolts and nuts constitute the fixing means 106.

Figure 3:
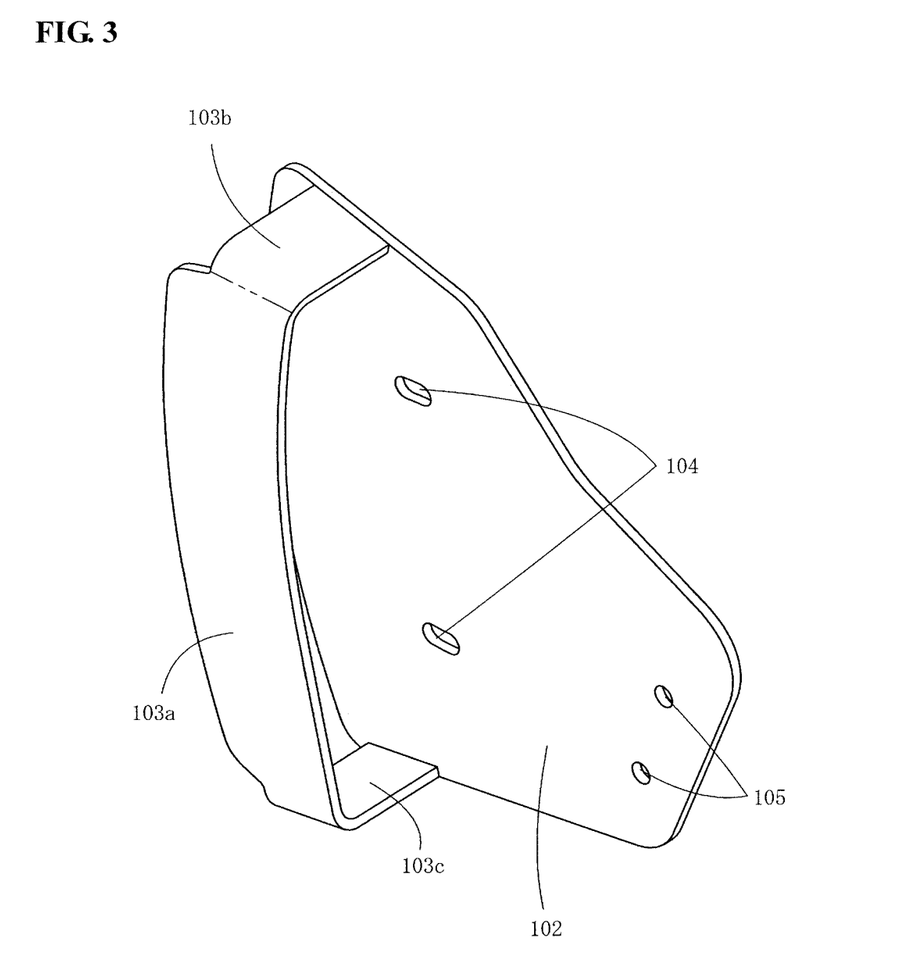
FIG. 3 is a perspective view of a bracket according to the first embodiment.

As illustrated in FIG. 3, a flat plate that has a front portion and a rear portion constitutes the attachment plate 102. The length of the attachment plate 102 in the upward-downward direction decreases from the front end of the front portion toward the rear end of the rear portion. The attachment plate 102 is chamfered and rounded. A first hole portion 104 is formed in the front portion, and a second hole portion 105 is formed in the rear portion. The first hole portion 104 has two long holes formed in a circular arc shape so that the attachment angle of the light 101 can be adjusted. The second hole portion 105 has two round holes. The number of the holes in the first hole portion 104 and the second hole portion 105 can be appropriately changed.

The protective frame 103 is formed in the front portion of the attachment plate 102 so as to cover at least a part of the light 101. As illustrated in FIG. 2, the front portion of the light 101 is accommodated in the protective frame 103 (strictly speaking, in the space that is formed by the protective frame 103 and the attachment plate 102). Accordingly, the protective frame 103 is capable of protecting the front portion of the light 101 and, additionally, blocking the inward component of the light of the light 101 (such as light that illuminates the mast). In addition, the rear portion of the light 101 is removably attached to the attachment plate 102 by the fixing means 106 in a state of leaving the protective flame 103 rearwards.

The protective frame 103 has a vertical frame 103a, a first horizontal frame 103b, and a second horizontal frame 103c. The vertical frame 103a extends in the upward-downward direction of the vehicle body 2 in parallel with the attachment plate 102. The first horizontal frame 103b extends in the right-left direction of the vehicle body 2 continuously from the upper end of the vertical frame 103a and is in contact with the attachment plate 102. The second horizontal frame 103c extends in the right-left direction of the vehicle body 2 continuously from the lower end of the vertical frame 103a and is in contact with the attachment plate 102. The first horizontal frame 103b and the second horizontal frame 103c are welded to the attachment plate 102.

The first horizontal frame 103b and the second horizontal frame 103c are shorter than the vertical frame 103a. In other words, the length (width) of the bracket in the right-left direction is shorter than the length of the bracket in the upward-downward direction. From the viewpoint of making it difficult for the appearance of the forklift 1A to be impaired, it is preferable that the bracket has a width within the width of the front surface 8a of the front pillar 8. In a case where the bracket protrudes in the right-left direction from the front surface 8a of the front pillar 8, the amount by which the bracket protrudes is preferably as small as possible.

The side mirror 20 is provided for each front pillar 8. As illustrated in FIG. 4, the side mirror 20 is provided with a mirror main body 21, a mirror attachment portion 22, and fixing means 23.

The mirror main body 21 includes a mirror that reflects the right rear side (or the left rear side) of the vehicle body 2. One side of the mirror attachment portion 22 is fixed to the mirror main body 21, and the other side of the mirror attachment portion 22 is fixed to the inner surface 8c of the front pillar 8 by the fixing means 23. The fixing means 23 includes, for example, a shaft portion such as a bolt and a fixing portion such as a nut. In the present embodiment, two sets of bolts and nuts constitute the fixing means 23.

Figure 5:
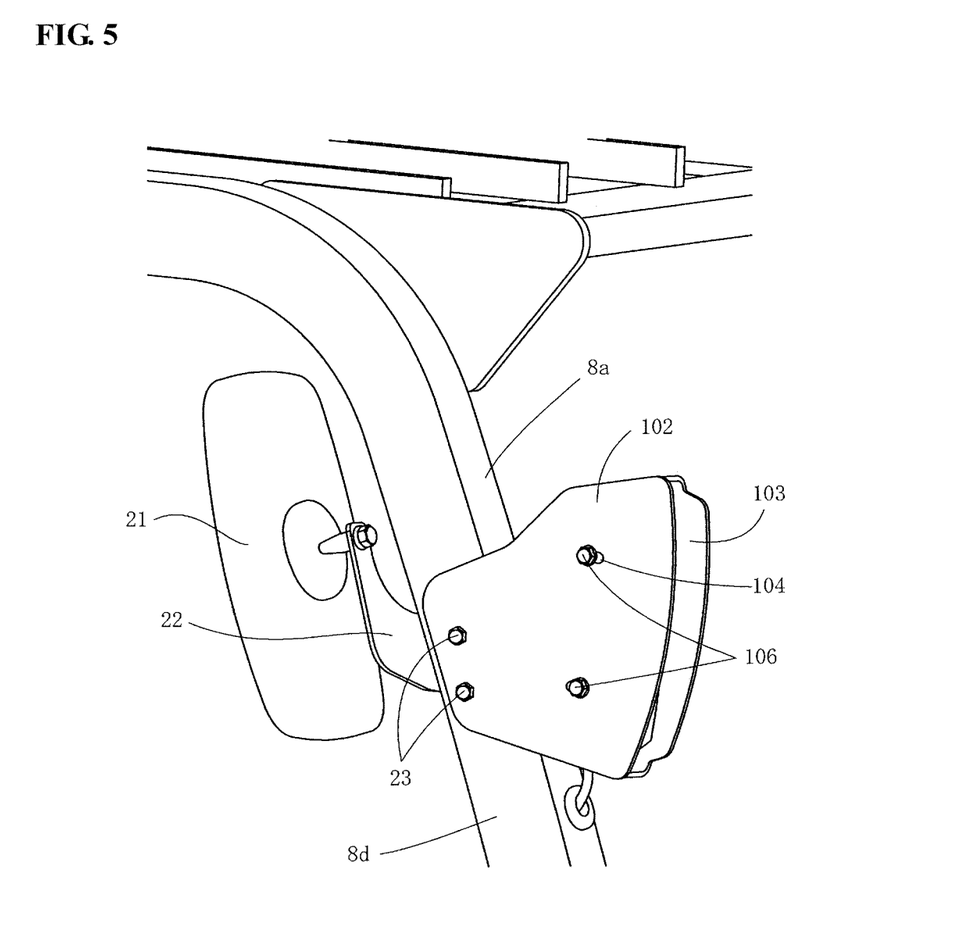
FIG. 5 is a diagram illustrating a state where the headlight according to the first embodiment is attached.

As described above, the other side of the mirror attachment portion 22 is fixed to the inner surface 8*c* of the front pillar 8 by the fixing means 23. Meanwhile, as illustrated in FIG. 5, the rear portion of the attachment plate 102 of the headlight 100 is fixed to the outer surface 8*d* of the front pillar 8 by the fixing means 23 so as to face the other side of the mirror attachment portion 22. In other words, the fixing means 23 fixes both the mirror attachment portion 22 and the attachment plate 102 to the front pillar 8. According to this configuration, it is possible to reduce the number of parts and to minimize processing of the front pillar 8 (such as processing for drilling a hole through which the shaft portion of the fixing means 23 passes).

As a result, according to the forklift 1A and the headlight 100 according to the present embodiment, it is possible to reduce the number of parts by using the bracket in which the attachment plate 102 and the protective frame 103 are integrally formed. In addition, it is possible to reduce the amount by which the bracket protrudes from the front pillar 8 (or to set the protrusion amount to zero).

Second Embodiment

Figure 6:
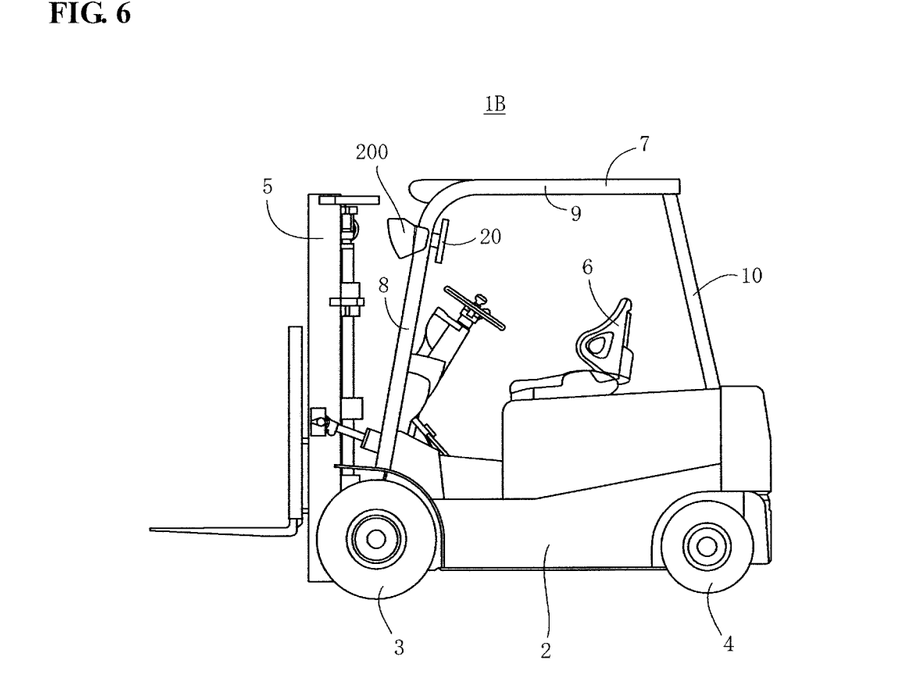
FIG. 6 is a side view of a forklift according to a second embodiment.

FIG. 6 is a side view illustrating a forklift 1B according to a second embodiment of the invention. The forklift 1B is identical to the forklift 1A according to the first embodiment except that a headlight 200 is provided instead of the headlight 100.

Figure 7:
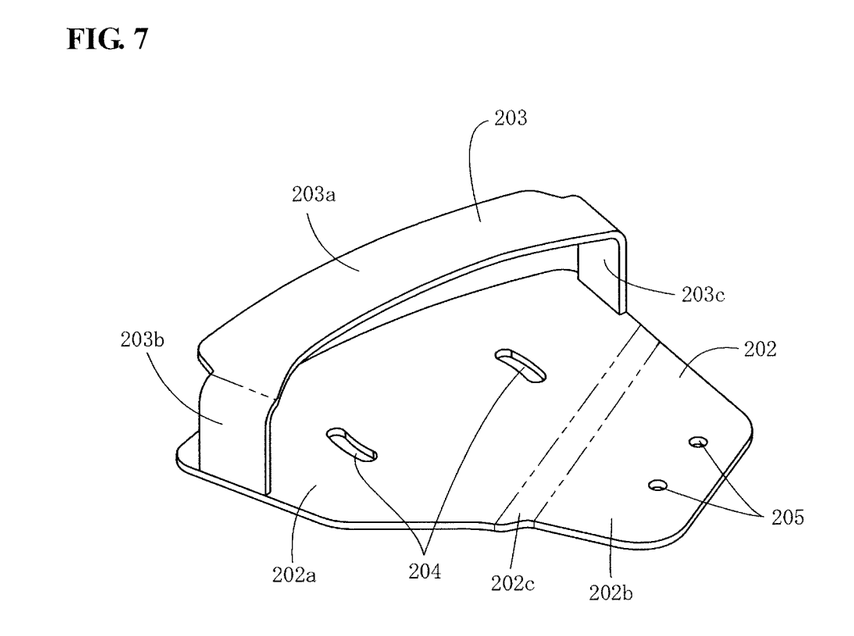
FIG. 7 is a perspective view of a bracket according to the second embodiment.

In the headlight 200 according to the second embodiment, the configuration of the light 101 is identical to that of the first embodiment and the configuration of the bracket is partially different from that of the first embodiment. As illustrated in FIG. 7, the bracket of the headlight 200 has an attachment plate 202 and a protective frame 203 made of metal (such as iron).

The protective frame 203 has a vertical frame 203*a*, a first horizontal frame 203*b*, and a second horizontal frame 203*c*. The vertical frame 203*a*, the first horizontal frame 203*b*, and the second horizontal frame 203*c* have the same configurations as the vertical frame 103*a*, the first horizontal frame 103*b*, and the second horizontal frame 103*c* of the first embodiment, and thus description thereof will be omitted.

The attachment plate 202 has a front portion 202*a*, a rear portion 202*b*, and a bent portion 202*c* between the front portion 202*a* and the rear portion 202*b*. The bent portion 202*c* is bent such that the front portion 202*a* and the rear portion 202*b* are not parallel. Specifically, the bent portion 202*c* is bent such that the light 101 is positioned on the front face of the front surface 8*a* of the front pillar 8.

In the front pillar 8, the width of the front surface 8*a* is different from the width of the rear surface 8*b* (in the present embodiment, the width of the front surface 8*a* is slightly larger than the width of the rear surface 8*b*). Accordingly, in a case where the headlight 100 of the first embodiment is fixed to the outer surface 8*d* of the front pillar 8, the light 101 slightly deviates from the front face of the front surface 8*a* of the front pillar 8. In this regard, in a case where the headlight 200 of the present embodiment is fixed to the outer surface 8*d* of the front pillar 8, the light 101 is positioned on the front face of the front surface 8*a* of the front pillar 8 since the attachment plate 202 has the bent portion 202*c*.

In the present embodiment, the rear portion 202*b* of the attachment plate 202 extends along the outer surface 8*d* of the front pillar 8 and the front portion 202*a* of the attachment plate 202 extends perpendicularly to the front surface 8*a* of the front pillar 8. In other words, the bent portion 202*c* of the attachment plate 202 corrects the position of the light 101 such that the light 101 is positioned on the front face of the front surface 8*a* of the front pillar 8.

The length of the attachment plate 202 in the upward-downward direction decreases from the front end of the front portion 202*a* toward the rear end of the rear portion 202*b*. The attachment plate 202 is chamfered and rounded. A first hole portion 204 is formed in the front portion 202*a*, and a second hole portion 205 is formed in the rear portion 202*b*. The first hole portion 204 has two long holes formed in a circular arc shape so that the attachment angle of the light 101 can be adjusted. The second hole portion 205 has two round holes. Incidentally, the number of the holes in the first hole portion 204 and the second hole portion 205 can be appropriately changed.

As a result, according to the forklift 1B and the headlight 200 according to the present embodiment, it is possible to reduce the number of parts by using the bracket in which the attachment plate 202 and the protective frame 203 are integrally formed.

In addition, according to the forklift 1B and the headlight 200 according to the present embodiment, the attachment plate 202 has the bent portion 202*c*, and thus it is possible to further reduce the amount by which the bracket protrudes from the front pillar 8 (or to set the protrusion amount to zero). Further, the position of the light 101 can be corrected such that the light 101 is positioned on the front face of the front surface 8*a* of the front pillar 8.

Hereinbefore, the embodiments of the industrial vehicle and the headlight according to the invention have been described, but the invention is not limited to the above-described embodiments.

The industrial vehicle of the invention may not be a forklift insofar as the vehicle is provided with a vehicle body, a pair of right and left front pillars provided in the front portion of the vehicle body, and the headlight of the invention provided on the front pillar.

The headlight of the invention can be appropriately changed in configuration insofar as the headlight is provided with a light and a bracket to which the light is attached and the bracket has an attachment plate and a protective frame formed in the front portion of the attachment plate so as to cover at least a part of the light.

The protective frame can be appropriately changed in configuration insofar as the protective frame has a vertical frame, a first horizontal frame shorter than the vertical frame, and a second horizontal frame shorter than the vertical frame.

The light can be appropriately changed in configuration insofar as the light illuminates the space in front of the vehicle body. Preferably, the light has a front portion and a rear portion, the front portion is accommodated in the protective frame, and the rear portion is removably attached to the attachment plate in a state of leaving the protective frame rearwards.

What is claimed is:
1. An industrial vehicle comprising:
a vehicle body;
a pair of right and left front pillars provided in a front portion of the vehicle body, at least one of the front pillars having a front surface, a rear surface, an inner surface, and an outer surface;

a headlight provided on the at least one of the front pillars, the headlight including a light illuminating a space in front of the vehicle body, the light having a front portion and a rear portion;

a bracket to which the light is attached, the bracket including an attachment plate having a front portion to which the light is attached, and a rear portion attached to the at least one of the front pillars;

a protective frame formed in the front portion of the attachment plate so as to cover at least a part of the light, the front portion of the light being accommodated in the protective frame, the rear portion of the light being removably attached to the attachment plate in a state of leaving the protective frame rearwards, the protective frame having a vertical frame extending in an upward-downward direction of the vehicle body, a first horizontal frame, and a second horizontal frame extending in a right-left direction of the vehicle body and Shorter than the vertical frame;

a side mirror provided on the at least one of the front pillars the side mirror being provided with a mirror main body, and a mirror attachment portion to which the mirror main body is attached; and fixing means for fixing both the mirror attachment portion of the side mirror and the attachment plate of the bracket to the at least one of the front pillars by fixing the mirror attachment portion of the side mirror to the inner surface of the at least one of the front pillars, and by also fixing the attachment plate of the bracket to the outer surface of the at least one of the front pillars.

2. The industrial vehicle according to claim 1, wherein the light has a width within a width of the at least one of the front pillars.

3. The industrial vehicle according to claim 1, wherein the front surface and the rear surface of the at least one of the front pillars differ in width from each other, wherein the attachment plate has a bent portion between the front portion and the rear portion of the attachment plate, wherein the rear portion of the attachment plate extends along the outer surface of the at least one of the front pillars, and wherein the front portion of the attachment plate extends perpendicularly to the front surface of the at least one of the front pillars.

* * * * *